Dec. 5, 1961 K. H. FOLSE 3,011,395
PHOTOGRAPHIC METHOD
Filed June 17, 1957

INVENTOR
KENNETH H. FOLSE
BY
ATTORNEY

United States Patent Office 3,011,395
Patented Dec. 5, 1961

3,011,395
PHOTOGRAPHIC METHOD
Kenneth H. Folse, Washington, D.C., assignor to Logetronics, Inc., Alexandria, Va., a corporation of Delaware
Filed June 17, 1957, Ser. No. 666,126
7 Claims. (Cl. 88—24)

This invention relates to a photographic method within automatic dodging is achieved by scanning incremental areas of a subject with a dwell period which is proportional to light directed from the incremental area of the subject towards a photosensitive surface to be printed.

In a copending application Serial No. 453,747, filed September 2, 1954, now Patent No. 2,842,025 dated July 8, 1958, a method of automatic dodging is disclosed wherein the intensity of a scanning light beam is modified as a function of the light directed from the subject towards the photosensitive surface to be printed. Inasmuch as there are definite advantages in maintaining light intensity substantially constant, particularly where a cathode ray tube source is employed, this invention attains such advantages by varying the length of time that each incremental area of the subject is illuminated in accordance with the amount of light directed from such incremental area to the photosensitive surface to be printed.

It is among the objects of the present invention to provide a photographic method comprising directing a light beam to illuminate an incremental area of the subject with a spot of finite area, directing light from the incremental area to form a real image on a photosensitive printing surface to expose the same, photoelectrically integrating light directed from the incremental area and shifting the beam to another incremental area after a dwell period proportional to a function of integrated light, and similarly shifting the beam until each incremental area of the subject has been printed.

Where the subject is a transparency, such as a photographic negative, the light beam will be transmitted through it to the photosensitive surface on which the print is to be made. Preferably, the intensity of the light beam and the area of the spot size are maintained substantially constant. And in the preferred embodiment, a cathode ray tube having a fluorescent screen is employed as the light source.

Figure 1:
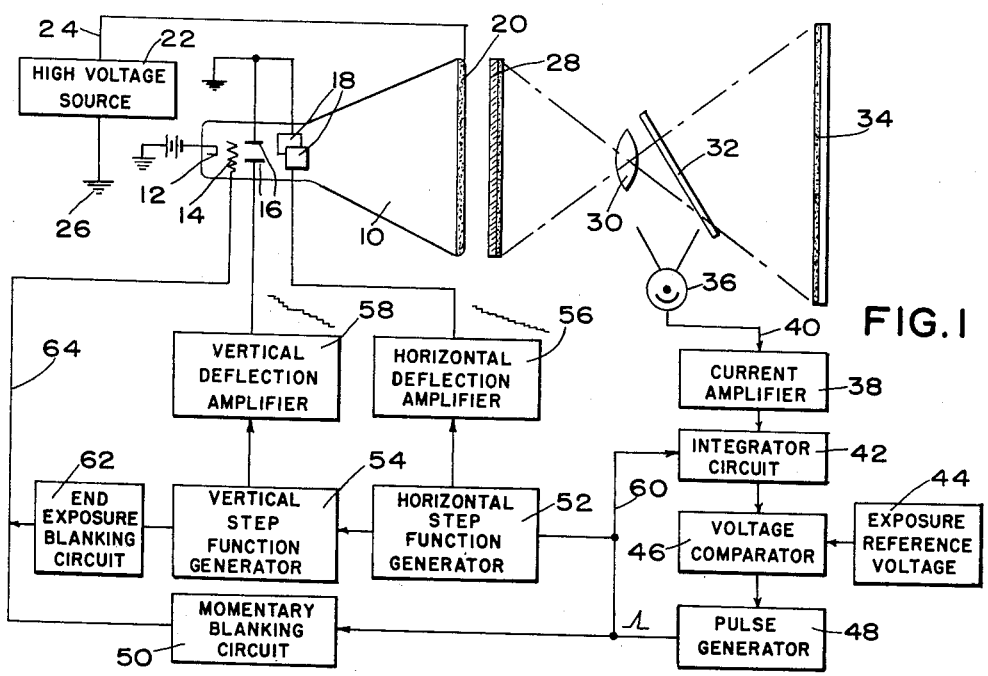
Figure 2:
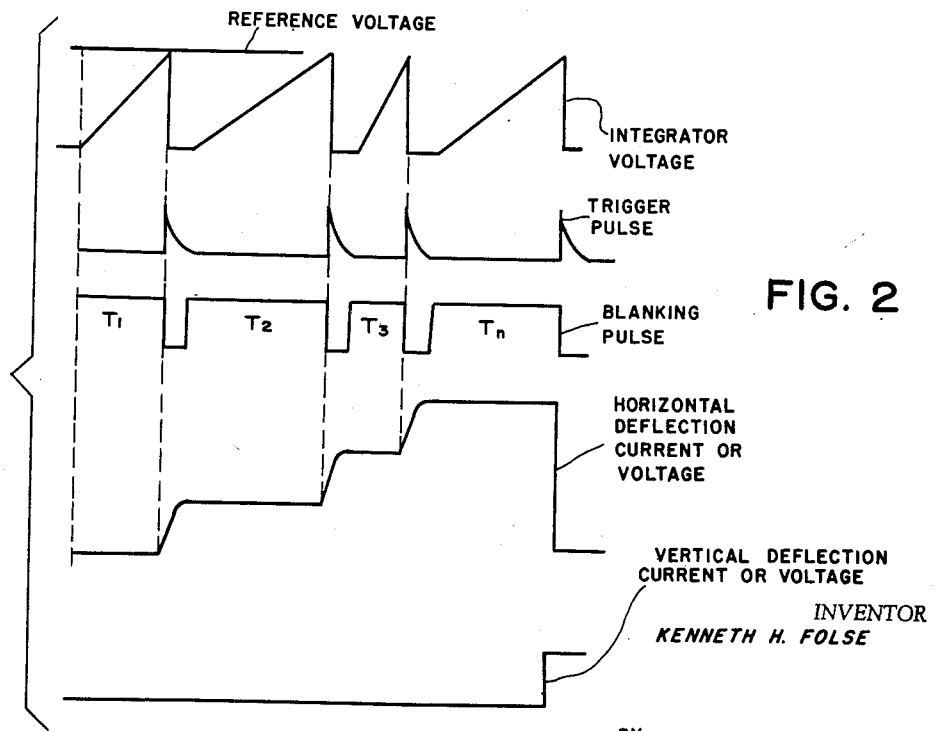

A more complete understanding of the invention will follow a description of the accompanying drawing wherein:

FIG. 1 is a schematic diagram depicting apparatus with which the method is achieved; and FIG. 2 is a representation of curves depicting the relative conditions of various portions of the circuit of FIG. 1.

A cathode tube 10 as shown in FIG. 1 is provided with a cathode 12, a control electrode 14, vertical deflection plates 16, horizontal deflection plates 18, and a fluorescent screen 20. A source of high voltage 22 is connected to the screen by a conductor 24 and a ground 26. A transparency such as a photographic negative 28 is suitably supported in front of the screen 20 to be illuminated by a spot of finite area produced when an electron beam bombards the fluorescent screen to produce a light beam. Light from the fluorescent screen passing through the transparency is projected by a lens 30 through a beam splitter 32 to a photosensitive surface 34 to be exposed for the production of a print.

A photoelectric sensing device such as a phototube 36 receives a portion of the light directed from the subject 28 by means of the beam splitter 32 to supply a current amplifier 38 by means of a lead 40. Current from the amplifier 38 is fed to an integrator circuit 42 wherein a capacitor is charged or discharged, as the case may be, until the voltage across it reaches a predetermined value equal to that supplied by the exposure reference voltage 44 with which it is compared by a voltage comparator 46. When these voltages become equal, the circuit of the pulse generator 48 will be triggered to actuate a momentary blanking circuit 50 connected to the control electrode 14 to momentarily inactivate the beam of exposing light. This same pulse actuates the horizontal step function generator or the vertical step function generator in a prescribed order that will ultimately assure complete scanning of the subject, and these function generators 52 and 54 respectively, have their outputs connected to the horizontal deflection amplifier 56 and the vertical deflection amplifier 58 respectively. The horizontal deflection amplifier is connected to one of the horizontal deflection plates 18, the other of which is connected to ground. Similarly, the vertical deflection amplifier is connected to one of the vertical deflection plates 16, the other of which is grounded.

The pulse from the generator 48 is also fed through a conductor 60 to the integrator circuit 42 to restore its initial condition after each shift of the light beam from one incremental area of the subject to the next. These pulses from the generator 48 which produce the stepping functions to provide complete scanning, are accumulated by an end exposure blanking circuit 62 connected to the control electrode 14 of the cathode ray tube 10 through a lead 64 to discontinue the light beam at the end of each scanning cycle.

It will be understood that each time the beam is deflected from one incremental area of the subject to the next, the light beam will assume a new position and maintain it to illuminate the photosensitive surface to be printed for a length of time which will vary with the density of the transparency 28 in the example illustrated. To obtain a constant exposure for all spot conditions, it is necessary that:

$$E = I_1 T_1 = I_2 T_2 = I_3 T_3 = I_n T_n$$

where E represents constant exposure, $I_1$, $I_2$, $I_3$ and $I_n$ represent the average intensity of each incremental area of the photosensitive surface and $T_1$, $T_2$, $T_3$, and $T_n$ represent the time that the light spot remains at its respective positions, or in other words, the dwell time.

If for example, each trigger pulse from the pulse generator 48 causes a 1% change of the horizontal deflection voltage, one hundred such pulses will produce a row of one hundred discrete spot positions. And if, as illustrated in the drawing, the output of the horizontal step function generator is used to drive the vertical deflection system in steps of 1%, the resulting square field will be composed of ten thousand discrete spot positions or incremental areas and the completed image will be composed of this same number of elemental exposures.

By virtue of the method contemplated herein, since the minimum dwell may be of the order of a few microseconds and with no basic limitations on the maximum dwell, a dynamic range approaching infinity becomes possible. This possibility coupled with the more efficient use of a light spot of maximum intensity from the cathode ray tube, represents a tremendous advance over methods previously proposed. And since the feed-back arrangement employed herein is not a closed feed-back loop in the ordinary sense, it is not subject to objectionable oscillation under many conditions of phase and gain encountered with such a closed loop.

It is contemplated that for certain applications, non-linear characteristics be introduced into the integrating circuit rendering it possible to obtain increase of contrast, reversal of contrast and reduction of contrast of the image relative to the transparency.

It will be understood that while the invention has been illustrated and described with reference to a photographic enlarger, it is applicable to contact printers, copy cameras and still cameras and may be adapted for use with subjects other than transparencies such as opaque subjects or those having three dimensions. Accordingly, the invention should not be limited to the form illustrated and described beyond the scope of the appended claims.

I claim:

1. A photographic reproduction method comprising directing a light beam to illuminate for a variable dwell period an elemental area of a subject with a spot of finite area, directing light from said elemental area to form a real image on a photosensitive printing surface to expose the same, photoelectrically integrating light directed from said elemental area until said integrated light reaches a predetermined value, and then intermittently shifting said beam until all elemental areas of said subject have been reproduced, another elemental area after said dwell period becomes proportional to a function of integrated light, and similarly shifting said beam intermittently until each elemental area of said subject has been printed.

2. A photographic method as set forth in claim 1 wherein said subject is a transparency and said light beam is transmitted therethrough.

3. A photographic method as set forth in claim 1 wherein the intensity of said beam is substantially constant.

4. A photographic method as set forth in claim 1 wherein the area of said spot is substantially constant.

5. A photographic method as set forth in claim 1 wherein said light beam is produced by a cathode beam.

6. A photographic method as set forth in claim 1 wherein said beam is momentarily inactivated between dwell periods.

7. A photographic method as set forth in claim 1 wherein said beam is inactivated after all elemental areas of said subject have been illuminated thereby.

References Cited in the file of this patent

UNITED STATES PATENTS

| | | |
|---|---|---|
| 2,214,072 | Biedermann | Sept. 10, 1940 |
| 2,480,423 | Simmon | Aug. 30, 1949 |
| 2,591,842 | Llewellyn | Apr. 8, 1952 |
| 2,757,571 | Loughren | Aug. 7, 1956 |
| 2,794,366 | Canaday | June 4, 1957 |
| 2,798,114 | Schlesinger | July 2, 1957 |
| 2,825,754 | Toulon | Mar. 4, 1958 |
| 2,842,025 | Craig | July 8, 1958 |

FOREIGN PATENTS

| | | |
|---|---|---|
| 428,602 | Great Britain | May 7, 1935 |
| 713,285 | Great Britain | Aug. 11, 1954 |
| 909,949 | France | Jan. 14, 1956 |

UNITED STATES PATENT OFFICE

CERTIFICATE OF CORRECTION

Patent No. 3,011,395            December 5, 1961

Kenneth H. Folse

It is hereby certified that error appears in the above numbered patent requiring correction and that the said Letters Patent should read as corrected below.

Column 3, line 17, for "reproduced," read -- reproduced. --; same line 17, beginning with "another elemental area" strike out all to and including "been printed." in line 21, same column 3.

Signed and sealed this 8th day of May 1962.

(SEAL)
Attest:

ERNEST W. SWIDER
Attesting Officer

DAVID L. LADD
Commissioner of Patents